March 12, 1968 L. K. HAN 3,373,286
DEVICE FOR MEASURING THE CHARACTERISTICS OF A MATERIAL
MOVING ON A CONVEYOR WITH MEANS FOR
MINIMIZING THE EFFECT OF FLUTTER
Filed Sept. 18, 1964 3 Sheets-Sheet 1
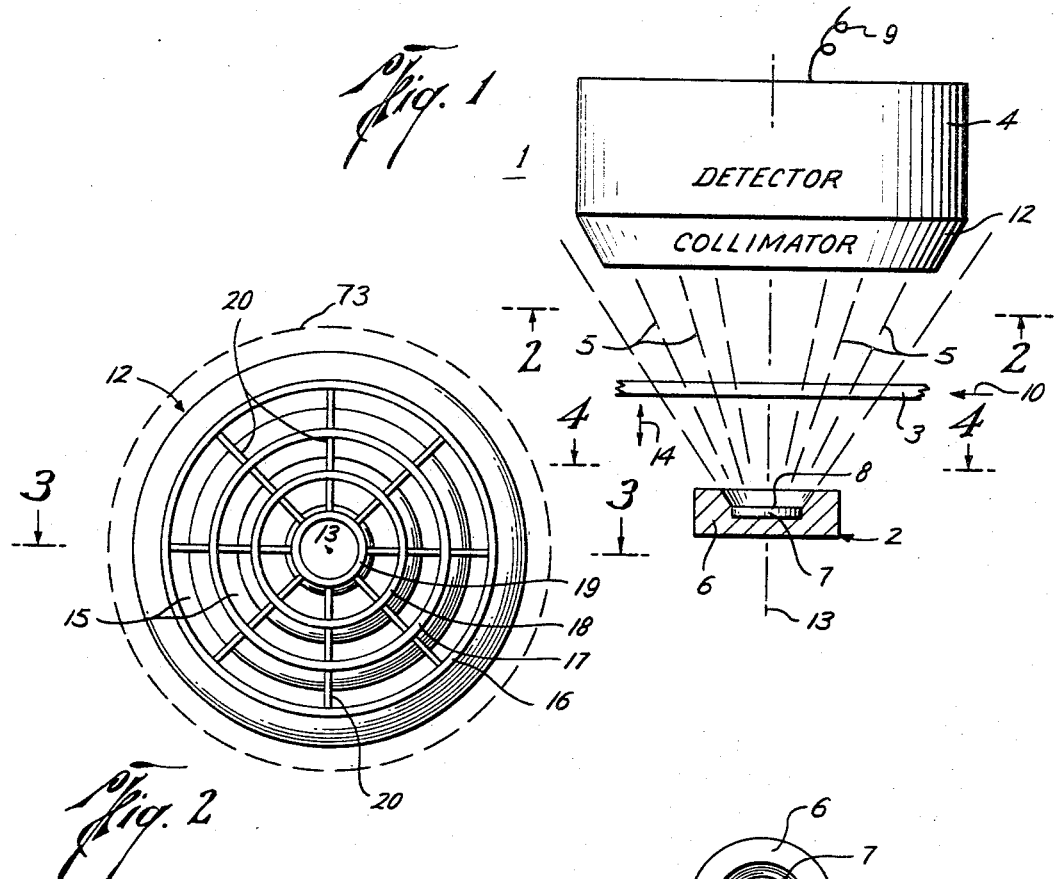
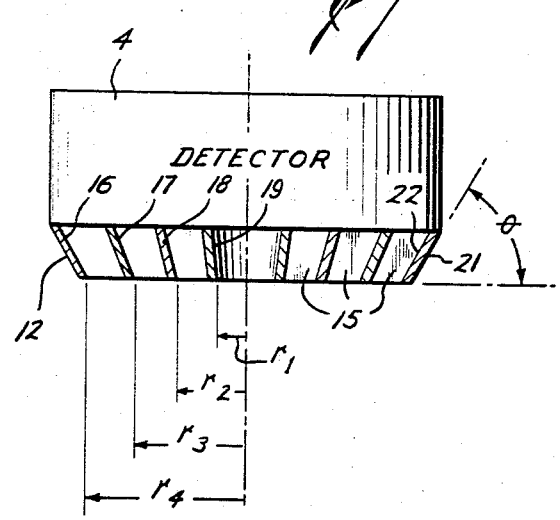
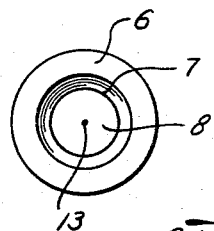
Linus K. Han
INVENTOR.
BY William T. Fryer III
ATTORNEY March 12, 1968     L. K. HAN     3,373,286
DEVICE FOR MEASURING THE CHARACTERISTICS OF A MATERIAL
MOVING ON A CONVEYOR WITH MEANS FOR
MINIMIZING THE EFFECT OF FLUTTER
Filed Sept. 18, 1964     3 Sheets-Sheet 2
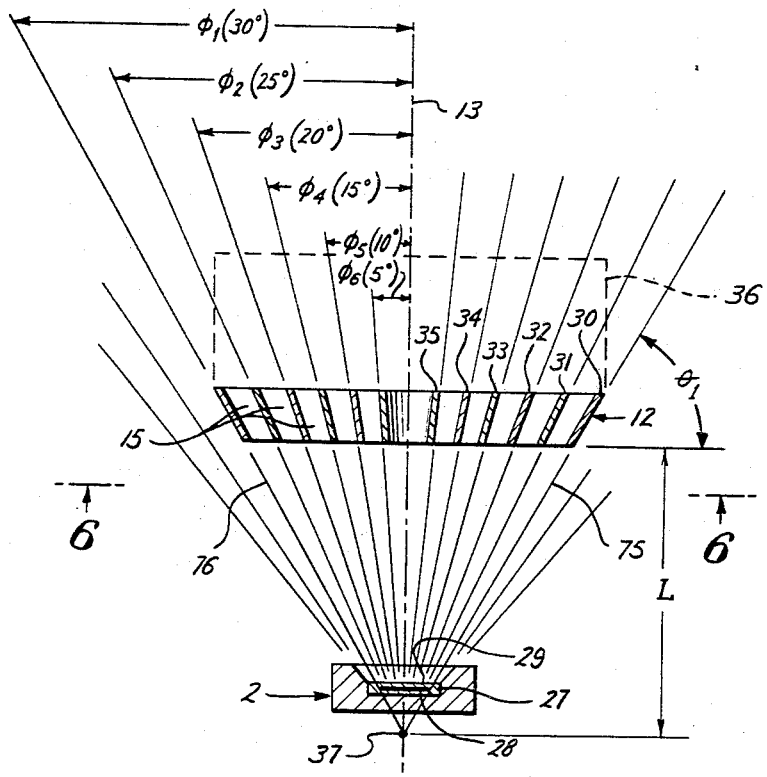
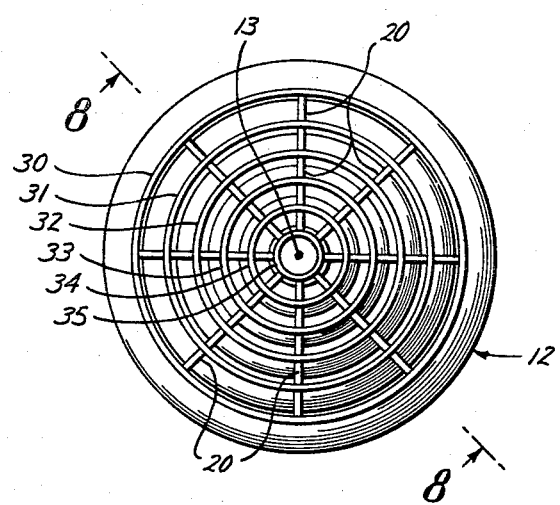
Linus K. Han
INVENTOR.
BY William T. Fryer III
ATTORNEY March 12, 1968  L. K. HAN  3,373,286
DEVICE FOR MEASURING THE CHARACTERISTICS OF A MATERIAL
MOVING ON A CONVEYOR WITH MEANS FOR
MINIMIZING THE EFFECT OF FLUTTER
Filed Sept. 18, 1964  3 Sheets-Sheet 3
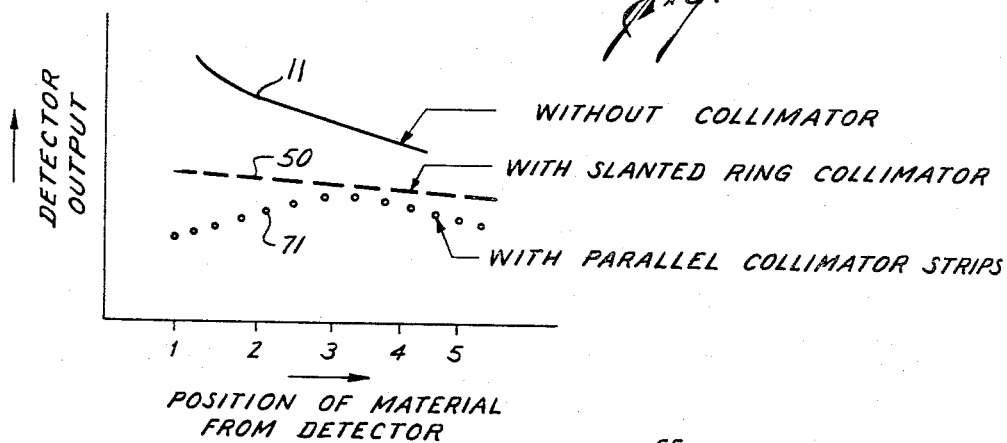
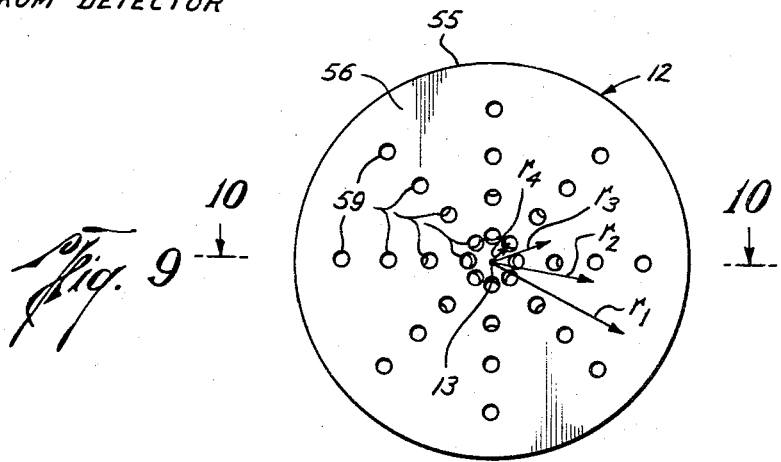
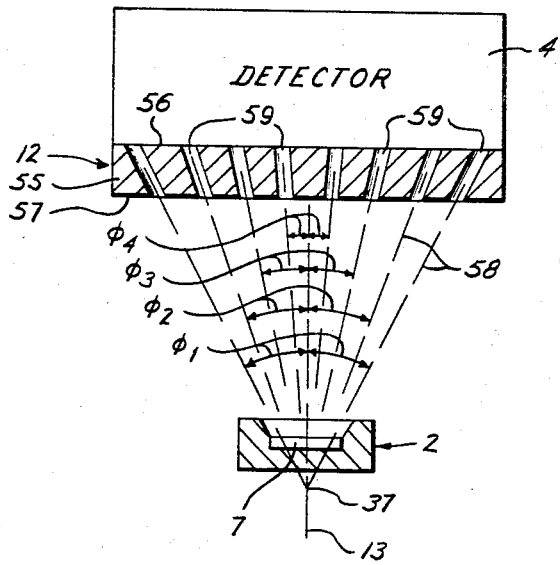
Linus K. Han
INVENTOR.
BY William T. Fryer III
ATTORNEY United States Patent Office 3,373,286
Patented Mar. 12, 1968

3,373,286
DEVICE FOR MEASURING THE CHARACTERISTICS OF A MATERIAL MOVING ON A CONVEYOR WITH MEANS FOR MINIMIZING THE EFFECT OF FLUTTER
Linus K. Han, Columbus, Ohio, assignor to Industrial Nucleonics Corporation, a corporation of Ohio
Filed Sept. 18, 1964, Ser. No. 397,502
14 Claims. (Cl. 250—105)

The present invention is related to measuring and testing devices and, more particularly, is concerned with an improvement in measurement reliability and accuracy for a nuclear radiation gauge.

A great deal of development has taken place in the art of measuring one or more characteristics of a material using nuclear radiation. It has been found very advantageous to measure such characteristics as thickness, mass per unit area, density, hardness, composition, for example. The apparatus, generally termed a gauge, usually comprises a source of nuclear radiation and a detector positioned in any one of several relationships to permit the radiation to interact with the material. The radiation leaving the material is transformed or transduced by a detector into an electrical signal that is a function of radiation intensity. The present invention is particularly directed to the arrangement, generally termed a transmission gauge, wherein the source and detector are placed on opposite sides of the material to be tested so that the detector receives the radiation passing through the material. A characteristic of the material, such as thickness or mass per unit area, changes the attenuation of the radiation, either increasing or decreasing the radiation intensity reaching the detector, and the electrical signals varies with the change in the material characteristic. The electrical signal is indicated in a suitable manner, usually by a meter having a scale calibrated for the particular characteristic.

It is essential in the measurement of a materal characteristic with a transmission gauge that the only change in radiation intensity reaching the detector be due to the material characteristic being measured. There are, however, other variables that can and do affect the output of a detector. One of these factors is the position of the material in the air gap between the source and detector. Movement of the material, either closer to the detector or to the source is generally termed "flutter" and can, unless properly compensated for, cause the output of the detector to change irrespective of any change in the material characteristic being measured. Flutter is very undesirable and the prior art has proposed to eliminate the effect in several ways. One approach has been to hold the material as rigidly as possible in a fixed position in the air gap, requiring a rather complex mechanical apparatus. When the material is moving, as is the case in most of the transmission gauge applications, a mechanical support that eliminates substantially all of the material flutter is very difficult to achieve. Normally, it is desirable to incorporate some other form of compensation for flutter and the prior art has proposed the use of a collimator that is positioned between the detector and the material, as taught in British Patent 689,857. The collimator tended to eliminate radiation that did not come directly from the source, i.e., scattered radiation from the air or the material. The collimator arrangement comprised spaced strips parallel to a line from the detector to the source. The apertures formed by these strips had axes parallel to the source-to-detector line.

The use of a collimator having parallel strips required that the source have a very large radiation emitting surface area that had to span at least the radiation responsive area of the detector to provide sufficient radiation intensity for a high signal-to-noise ratio from the detector. The collimator acted to reduce the amount of radiation reaching the detector radiation responsive area, and, because of the decrease in radiation reaching the detector, necessitated the use of a stronger source to restore the high signal-to-noise ratio. A stronger source should be avoided, if possible, and the design efforts should be to optimize the signal-to-noise ratio by some other technique.

Recognizing the limitations in the prior art form of transmission gauges for flutter compensation and particularly the need for improvement in the detector-collimator arrangement, the present invention has for one of its objects to provide a collimator for a transmission gauge that substantially eliminates the effect of flutter while maximizing the signal-to-noise ratio from the detector.

A further object of the present invention is to provide a collimator in combination with a detector and source to increase the signal-to-noise ratio of the detector for a given source strength.

It is another object of the present invention to provide a detector having a collimator which is relatively simple to construct and economical to build for minimizing the effect of flutter and to maximize the amount of radiation that reaches the detector.

It is a further object of the present invention to provide a transmission gauge detector having a larger window area than the radiation emitting surface area of its associated nuclear radiation source with improved flutter compensation.

It is a still further object of the present invention to provide a transmission gauge detector with flutter compensation that allows the use of a smaller strength radioactivity source while producing a high signal-to-noise ratio.

These and other objects are achieved by the use of a collimator of special design in accordance with the present invention. In general, it has been found that the collimator between the detector and material can be arranged to select only the part of the nuclear radiation passing through the material that radiates directly from the source, even though the source is of small radiation-emitting surface area and produce a high signal-to-noise ratio. The collimator includes apertures that are angularly disposed with respect to a line from the detector to the source location. The collimator apertures focus on the source location, preferably at the effective source location for a particular source design. In one embodiment, the apertures are formed in a block of nuclear radiation shield material and the axis of each of the holes converge at the effective source location. In another embodiment, the apertures are formed by concentric rings centered on the source-detector line, each of the rings having a frustoconical shape narrowing toward the source location.

The present invention is described with reference to several embodiments, each having unique features and advantages, reference being made to the drawings wherein, FIG. 1 is an elevation view, partially in section, of a transmission gauge measuring a characteristic of a material.

FIG. 2 is a plan view looking up at the bottom of one embodiment of a collimator, arranged in accordance with the present invention, the view being along lines 2—2 of FIG. 1.

FIG. 3 is an elevation view, partially in section, showing the internal arrangement of the collimator embodiment of FIG. 2, the view being taken along lines 3—3 of FIG. 2.

FIG. 4 is a plan view of the radioactive source housing shown in FIG. 1, the view being taken along lines 4—4 of FIG. 1.

FIG. 5 is an elevation view, partially in cross-section, showing the angular relationship of the apertures for another embodiment of a collimator with respect to the source location in accordance with the present invention.

FIG. 6 is a plan view, looking at the bottom of the collimator shown in FIG. 5, the view being taken along the lines 6—6 of FIG. 5.

FIG. 7 is a graph for illustrating the operation of a collimator constructed in accordance with the present invention.

FIG. 8 is an elevation view in section of a collimator shown in FIG. 5 for the purpose of exposing the radial dividers, the view being taken along the lines 8—8 of FIG. 6.

FIG. 9 is a plan view of another collimator embodiment in accordance with present invention.

FIG. 10 is an elevation view, partially in section, showing the collimator of FIG. 9 arranged with a detector and source, and illustrating the angular relationship of the holes in the block, the view being taken along the lines 10—10 of FIG. 9.

In the several figures, parts that are the same have been identified with the same reference numeral.

A typical transmission gauge 1 (FIG. 1) comprises a radiation source 2 disposed on one side of a material 3 and a detector 4 disposed on the other side of material 3 to receive the radiation 5 passing through material 3. Source 2 can be of a variety of designs in accordance with prior art techniques. In the illustrated embodiment, source 2 has a cylindrical housing 6 with a central aperture opening towards material 3 and containing a capsule 7 of cylindrical shape that emits nuclear radiation. Capsule 7 has a surface area 8 facing material 3 that emits the nuclear radiation passing to material 3, while the nuclear radiation from the other surface areas of capsule 7 is absorbed by housing 6 which is constructed of nuclear radiation shield material. The type of nuclear radiation used depends on the material and characteristic to be measured. Beta, gamma, Bremsstrahlung, alpha, or other types of nuclear radiation have specific areas of application. Housing 7 also collimates the radiation into a wide solid angle sufficient to cover the area 73 (FIG. 1) in which the detector 4 is positioned with a substantial uniform nuclear radiation intensity. The radioactive material in capsule 7 is selected for a particular material in order to have sufficient radiation passing through the material 3 to produce a high signal-to-noise ratio. The stronger the source, e.g., using more curies of a given radioactive material or selecting a radioactive material having a greater specific activity, the higher will be the signal-to-noise ratio. It is, however, desirable to utilize as small a source strength as possible while still obtaining sufficient signal-to-noise ratio for a reliable measurement of the desired material characteristic.

Material 3 can be of any type, i.e., metal, plastic, for example, and the property or characteristic of the material that is measured can be of a variety of types. For example, the thickness or weight per unit area of the material can be measured. The material can be a liquid and density concentration or other characteristics can be measured. In other words, the material 3 need not be a strip. It can be any form of material either in a liquid, solid, or gaseous state.

Detector 4 has the broad function of transducing or transforming the radiation passing through material 3 into an electrical signal that appears on the electrical output cable 9 and is coupled to a utilizing device such as a calibrated voltmeter and/or used to control a process forming machine that controls the characteristic of material 3 to a predetermined level, as is well known in the prior art.

A variety of radiation detectors can be used for detector 4, depending on the selection of the radioactive material in source 2. Beta, gamma, or Bremsstrahlung radiation, for example, as well as other types of nuclear radiation can be transformed into an electrical signal which is proportional to the radiation intensity. Ionization chambers or scintillation-type detectors are very commonly used. The detector 4 has a side, generally termed a window, through which radiation can enter and this side faces material 3 and receives the radiation from source 2. Normally, radiation from other than source 2. is prevented from reaching detector 4 by appropriate shielding. The detector window has a relatively large window surface area in order to increase the signal-to-noise ratio and this surface area is usually larger than the radiation-emitting surface 8 of capsule 7.

Material 3 can be moving in the direction as indicated by arrow 10 as part of a process forming the material, such as rubber or sheet metal, for example. But lateral movements in the direction indicated by arrow 14 are not desirable. This movement, of course, is the flutter referred to above. Preferably, material 3 should be held as rigid as possible to prevent such movement. Since there may be flutter even with the best of mechanical support for material 3, it is necessary to provide some means for eliminating the effect of flutter on the detector output signal.

FIG. 7 is an illustration of what happens to the detector output signal, assuming no change in the material characteristic being measured, as material 3 moves from a position right next to the detector towards source 2. The detector output signal follows curve 11 under these circumstances, assuming no compensation for the flutter effect, and it is apparent that the detector output signal increases considerably as material 3 moves away from detector 4. This variation in detector output signal is superimposed on any variation produced by a change in the material characteristic and reduces the accuracy and reliability of the measurement.

To compensate for or eliminate substantially the effect of flutter, it has been proposed to use a collimator 12 (FIG. 1) having strips parallel to a straight line 13 drawn from source 2 to detector 4, preferably from the center portion of the window of detector 4 to the center portion of the source radiation emitting surface 8. Radiation directed parallel to line 13 would enter detector 4 and almost all other radiation would be eliminated by collimator 12. This approach could reduce the effect of flutter, as illustrated by curve 71 (dotted line) of FIG. 7. However, the output from the detector would still change with the position of material 3 and, even more important, the detector output would be substantially less, reducing the signal-to-noise ratio. To return the signal-to-noise ratio to the desired level without the collimator, it would be necessary to increase the source strength.

The present invention is an improved collimator uniquely arranged with respect to the source location such that sources having relatively small radiation-emitting surface areas will produce a maximum signal-to-noise ratio and will eliminate even further the effect of flutter on the detector output signal.

In general, collimator 12 (FIG. 1) in accordance with the present invention is provided with apertures that are angularly disposed with respect to line 13 in a plane containing line 13 such that the collimator apertures are substantially focused on the location of source 2, preferably at a point which is generally termed the effective source location. The apertures can be formed in several ways. For example, a number of concentric rings having a frusto-conical shape can be combined such that the apex of the cones containing the rings converge at the effective source location. Alternatively, for example, the apertures can be formed as holes in a block of nuclear radiation shield material, the axis of the holes converging at the effective source location. The angular arrangement of the apertures increases the amount of radiation reaching the window of detector 4, while still measuring substantially only the uncollided (direct or straight line) radiation from source 2. Further, the effect of flutter is substantially reduced to an even greater extent than when parallel strips are used.

One embodiment of collimator 12 in accordance with the present invention is shown in FIGS. 2 and 3. Collimator 12 is supported over the window of detector 4 by suitable means (not shown). In collimator 12 the apertures 15 (FIG. 3) which pass radiation from source 2 to detector 4 are formed by rings 16, 17, 18, and 19 of decreasing diameter in the order stated. The rings are contsructed of nuclear radiation shield material, preferably a dense metal that is easily fabricated and are concentrically disposed about the source-to-detector line 13 and spaced apart and held together by dividers 20 (the dividers 20 are not shown in FIG. 3 for clarity). The outer ring 16 can be fastened to detector 4 by a screw fastener or by welding, for example, and is aligned with the outer edge of the window of detector 4, so that all the radiation entering detector 4 passes through collimator 12. The shape of each of rings 16, 17, 18, and 19 is uniquely related to the location of source 2 to focus apertures 15. Each of the rings has opposite flat, parallel sides, for example sides 21 and 22 on ring 16. The angle of inclination $\theta$, of ring sides 21 and 22 with respect to a plane perpendicular to line 13 is a function of the diameter of the particular ring. The greater the diameter $d$ the smaller angle $\theta$ becomes for a given distance between the detector 4 and source 2. This relationship can be expressed by the equation $$\theta \alpha \frac{1}{d} \quad (1)$$

Thus, the angle $\theta$ for ring 19 is greater than the angle $\theta$ for the other rings and angle $\theta$ decreases in proportion to the ring radii $r2$, $r3$, and $r4$ for rings 18, 17, and 16, respectively.

The arrangement of the rings in this manner tends to focus apertures 15, directing the aperture central axes to converge at the location of source 2. The location of the axes convergence need not be at a point or at the exact center of capsule 7. The axes convergence can occur in a volume essentially including source 2. For optimum signal-to-noise ratio the location of convergence depends on the arrangement of the radioactive material in capsule 7 and the area of the radiation-emitting surface 8 of capsule 7. Collimator 12 then focuses at what is termed the effective source location. For example, assuming that the radioactive material in capsule 7 is so small, as it sometimes is, that it can be represented essentially by a point, the focus or converging location would be at the location of the point source. Assume, however, that the radioactive material is spread out in a plane substantially parallel to the plane of the material 3. It is necessary to focus detector 4 at a location which best represents the point where, if a point source were used, radiation from the source would substantially be the same as for the actual source. This imaginary location, termed the effective source location, is generally behind, i.e., on the opposite sides of capsule 7 from the material 3.

As a further illustration, assume that source 2 has a capsule 27 (FIG. 5) and the radioactive material therein 28 is disposed in a plane substantially parallel to the radiation-emitting surface 29 and distributed over a circular area. Radiation would emanate from the radioactive material 28 in all directions and some of the radiation will pass through the apertures 15 formed by rings 31 through 35 disposed concentrically about the source-to-detector line 13. Detector 4 is not shown in FIG. 5, for clarity, but is positioned on the opposite side of collimator 12 from source 2, the outline of detector 4 being represented by dash lines 36.

The effective source location of source 2 can be at point 37, on the opposite side of source 2 from collimator 12. Straight lines drawn from this point through the collimator apertures 15 will reach the window of detector 4. The effective source location 37 is located behind source 2 whereby the maximum amount of radiation from the large planar surface area of radioactive material 28 will be permitted to reach the window of detector 4. A very good approximation of the effective source location is to draw straight lines from the outer edge of the radioactive material to the outer edge of the detector window. The intersection location of these lines, either a point or a small volume, is the effective source location. For example, radiation lines 75 and 76, at the outer edge of radioactive material, extend to the outer edge of the window of detector 4 and intersect at the effective source location 37.

Each of the rings 30–35 is shaped to focus apertures 15 on the effective source location 37. The inclination of a ring is determined by aligning the side with the effective source location. The slant angle $\phi$ formed between a line containing a ring side and the source-to-detector line 13 in a plane containing both lines is a function of the diameter of the ring in accordance with the equation:

$$\phi = \tan^{-1}\frac{r}{L} \quad (2)$$

where L is the distance from the front edge of the collimator to the effective source location (FIG. 5) and $r$ is the ring radius. Thus, each ring has a different slant angle. It can be seen that the focusing of collimator 12 on the source location improves the signal-to-noise ratio for a source having a smaller radiation emitting surface area than the detector window area. The disclosed relationship between the slant of the rings and the effective source location for a given source design provides optimum results.

Another way of considering the arrangement of collimator 12 with the concentric rings is to assume that the effective source location has a line passing through it which is rotated to generate the frusto-conical shape of the rings. In the illustrated embodiment, a right circular cone would be generated and the rings would be that part of the cone formed by cutting off the top and the bottom by parallel planes. The effective source location 37 is the apex of the generated cones containing rings 30 through 35.

Rings 30 through 35 have dividers 20 of nuclear radiation shield material that can serve to mechanically connect the rings together for structural rigidity and also to further collimate the radiation received from source 2. As best shown in FIG. 8, dividers 20 extend from the larger diameter side to the smaller diameter side of each ring, for example, larger side 40 and smaller side 41 of ring 30, and extends between the rings and is joined thereto by soldering or welding, for example. Each of dividers 20 is oriented in a plane containing the source-to-detector line 13 and a radial line of the rings. Radiation that could possibly enter collimator 12 from a location other than directly from source 2 is substantially further minimized by dividers 20 that act to collimate the radiation and allow only the direct radiation from source 2 to enter the window of detector 4.

A collimator arranged in accordance with the present invention embodying the concentric rings has proved to be an improvement over the prior art parallel strip form of collimator. Referring again to FIG. 7, curve 50 (dash line) for the collimator incorporating the rings in accordance with the present invention shows much less variation in detector output for flutter and the detector output is greater than for the prior art form of collimator represented by curve 71. The collimator embodiment with the rings is especially useful for small air gaps, i.e., source-to-detector spacing of relatively small dimension, say four or five inches, where the improvement in flutter compensation is very great. Even at much larger air gap dimensions improvement in signal-to-noise ratio is significant and the flutter compensation is impressive.

Another embodiment of a collimator in accordance with the present invention is illustrated in FIGS. 9 and 10, wherein collimator 12 is formed from a cylindrical block 55 of nuclear radiation shield material. Block 55 is attached at its larger area face 56 to detector 4 by suitable means, such as a fastener or welding, to overlie the detector window. Apertures are formed by holes 59 that extend from face 56 to the opposite face 57 and have central axes 58. Holes 59 are circular in cross section and are disposed in groups of four on a radial on opposite sides of source-to-detector line 13. The number of holes 59 on a radial is optional and the number of radials with holes is dependent on the size of collimator 12. Also, the size and configuration of holes 59 can vary along a radius. The central axis 58 of each of the holes disposed on a common circle is angularly inclined to focus at the effective source location 37 of source 2. The axes 58 of holes 59 disposed at another radius are similarly inclined at a different angle to focus detector 4 at the effective source location 37. Looking through block 55 in a plane containing source-to-detector line 13 and a particular diameter that cuts through holes 59 on that diameter (FIG. 10), it is easy to see that holes 59 at radius $r_1$ are all inclined, in their respective planes, at an angle $\phi_1$ from source-to-detector line 13. All the holes 59 disposed on radius $r_2$ have their axes forming an angle $\phi_2$ with respect to the source-to-detector line 13, and so on for the other radii $r_3$ and $r_4$ and the angles $\phi_3$ and $\phi_4$, respectively. The axes 58 of holes 59 converge at the effective source location 37, chosen to lie at a point optimum for the particular source design.

Collimator 12 with holes 59 provides good flutter compensation, while the output signal-to-noise ratio is not as good as for the embodiment using the concentric rings. With a large number of holes and the use of maximum hole size, the detector output signal-to-noise ratio can be increased considerably for a source having a relatively small radiation-emitting surface area in comparison with the area of the detector window.

In describing the preferred embodiments of the present invention, it is apparent that other arrangements, including changes and dimensions and construction are possible within the teaching and scope of the invention. Many of these changes and variations have been mentioned previously, for example, the type of detector that is used, the type of source, the construction and arrangement of the radioactive material and the selection of a suitable nuclear radiation shielding material from which the collimator 12 is manufactured. These changes and modifications are to be considered a part of the present invention whereby a transmission gauge can be provided which minimizes the effect of flutter and increases the signal-to-noise ratio for a given source size. The legal boundaries for the protection of this invention are defined in the appended claims.

What is claimed is:

1. Improved apparatus for measuring a characteristic of a material, that is transported by a material conveyor with nuclear radiation to minimize the effect of flutter, said apparatus comprising,
   a source of nuclear radiation,
   a detector positioned opposite and spaced from said source to permit said material to pass therebetween for producing an electrical signal that is a function of nuclear radiation passing through the material from said source, said detector having a window facing said material,
   means for supporting said source and detector in said opposite relationship,
   said source having a radiation emitting surface area that is less than the area of said window,
   means disposed between said detector and the material to select substantially only the part of the nuclear radiation passing through the material that radiates directly from the source, said selecting means including a collimator having apertures angularly disposed to focus said detector substantially on the location of said source.

2. Apparatus, as described in claim 1, wherein, said collimator apertures are formed by concentric rings of nuclear radiation shield material centered on a line between the source and detector, each of said rings having a frusto-conical shape narrowing toward the source location.

3. Apparatus, as described in claim 1, wherein said collimator apertures are holes in a block of nuclear radiation shield material, the axis of each of said holes converging with the other hole axes at the source location.

4. Improved apparatus for measuring a characteristic of a material, that is transported by a material conveyor with nuclear radiation to minimize the effect of flutter on said measurement, said apparatus comprising,
   a source and detector means spaced apart for said material to pass therebetween,
   a said source of nuclear radiation radiating over said wide solid angle toward the material,
   a detector means producing an electrical signal that is a function of radiation passing though the material, said detector means having a window facing said material,
   means for supporting said source and detector means in said spaced apart relation,
   said source having a radiation-emitting surface area that is less than the area of said window and of appreciable size,
   means positioned between said detector and the material to select substantially only the part of the nuclear radiation passing through the material that radiates directly from said source, said selecting means including a collimator having apertures angularly disposed to focus said detector substantially on the effective source location of said source.

5. Apparatus, as described in claim 4, wherein, said collimator apertures are formed by concentric rings of nuclear radiation shield material centered on a line between said source and detector, each of said rings having a frusto-conical shape narrowing toward said source.

6. Apparatus, as described in claim 4, wherein said collimator apertures are holes in a block of nuclear radiation shield material, the axis of each of said holes converging with the other hole axes at the effective source location of said source.

7. Improved apparatus for measuring a characteristic of a material, that is transported by a material conveyor with nuclear radiation to minimize the effect of flutter on said measurement, said apparatus comprising,
   a source and detector spaced apart for said material to pass therebetween,
   said detector producing an electrical signal that is a function of nuclear radiation, said detector having a window facing the material,
   said source producing nuclear radiation passing through the material from said source being received at said detector window, said source having a radiation-emitting surface area that is less than the area of said window, said nuclear radiation being produced by a radioactive material of appreciable volume and radiation-emitting surface area,
   means for supporting said source and detector in said opposite relationship,
   means disposed between said detector and the material to select substantially only the part of the nuclear radiation passing through the material that radiates directly from said source surface area, said selecting means including a collimator having apertures angularly disposed to focus said detector substantially on the effective source location of said source, said effective source location being on the opposite side of said radioactive material from said radiation-emitting surface and being generally approximated by the general convergence of straight lines drawn from the outer edge of said detector window to the outer edge of said radioactive material.

8. Apparatus, as described in claim 7, wherein, said collimator apertures are formed by concentric rings of nuclear radiation shield material centered on a line between said source and detector, each of said rings having a frusto-conical shape narrowing toward the effective source location of said source.

9. Apparatus, as described in claim 7, wherein said collimator apertures are holes in a block of nuclear radiation shield material, the axis of each of said holes converging with the other hole axes at the effective source location of said source.

10. Improved apparatus for measuring a characteristic of a material, that is transported by a material conveyor with nuclear radiation to minimize the effect of flutter on said measurement, said apparatus comprising, a source and detector means spaced apart for said material to pass therebetween, said source of nuclear radiation radiating over a wide solid angle toward the material, said detector means producing an electrical signal that is a function of radiation passing through the material, said detector means having a window facing said material, means for supporting said source and detector means in said spaced apart relation, said source having a radiation-emitting surface that is less than the area of said window, said nuclear radiation being produced by a radioactive material of appreciable volume and radiation-emitting surface area, means positioned between said detector and the material to select substantially only the part of the nuclear radiation passing through the material that radiates directly from said source, said selecting means including a collimator having apertures, said collimator apertures being holes in a block of nuclear radiation shield material, the axis of each of said holes being angularly disposed with respect to a line drawn from a central portion of said detector to a central portion of said source, the angles $\phi$ formed at the intersection of said line and said axes in planes containing said line being a function of the perpendicular distance $x$ from said line to said respective holes, in accordance with the relation, $$\phi = \tan^{-1} \frac{x}{y}$$

where $y$ is the distance between said detector and the effective source location of said source.

11. Improved apparatus for measuring a characteristic of a material, that is transported by a material conveyor with nuclear radiation to minimize the effect of flutter on said measurement, said apparatus comprising, source and detector means spaced apart for said material to pass therebetween, said source of nuclear radiation radiating over a wide solid angle toward the material, said detector means producing an electrical signal that is a function of radiation passing through the material, said detector means having a window facing said material, means for supporting said source and detector means in said spaced apart relation, said source having a radiation-emitting surface that is less than the area of said window, said nuclear radiation being produced by a radioactive material of appreciable volume and radiation-emitting surface area, means positioned between said detector and the material to select substantially only the part of the nuclear radiation passing through the material that radiates directly from said source, said selecting means including a collimator having apertures, said collimator apertures being formed by concentric rings of nuclear radiation shield material centered on a line from said source to said detector, each of said rings being inclined toward said source, the inclination angle $\theta$ in a plane containing said line, as deviations from a perpendicular to said line, being a function of the ring diameter $d$, in accordance with the relation, $$\theta \propto \frac{1}{d}$$

to focus said apertures on the effective source location of said source.

12. Improved apparatus for measuring a characteristic of a material, that is transported by a material conveyor with nuclear radiation to minimize the effect of flutter on said measurement, said apparatus comprising, source and detector means spaced apart for said material to pass therebetween, said detector producing an electrical signal that is a function of nuclear radiation, said detector having a window facing the material, said source of nuclear radiation producing radiation passing through the material from said source and being received at said detector window, said source having a radiation-emitting surface area that is less than the area of said window, said source having a radiation-emitting surface area that is less than the area of said window, said nuclear radiation being produced by a radioactive material of appreciable volume and radiation-emitting surface area, means for supporting said source and detector means in said spaced apart relation, means disposed between said detector and the material to select substantially only the part of the nuclear radiation passing through the material that radiates directly from said source surface area, said selecting means including a collimator having apertures, said collimator apertures being formed by concentric rings of nuclear radiation shield material centered on a line from said source to said detector, each of said rings being inclined toward said source, the inclination angles $\phi$ in a plane containing said line, as deviations from said line, being a function of the ring radius $r$, in accordance with the relation, $$\phi = \tan^{-1} \frac{r}{L}$$

where $L$ is the distance between said detector and the effective source location of said source.

13. Improved apparatus for measuring a characteristic of a material, that is transported by a material conveyor with nuclear radiation to minimize the effect of flutter on said measurement, said apparatus comprising, said source and detector means spaced apart for said material to pass therebetween, said detector producing an electrical signal that is a function of nuclear radiation, said detector having a window facing the material, said source of nuclear radiation producing radiation passing through the material from said source and being received at said detector window, said source having a radiation-emitting surface area that is less than the area of said window, said source having a radiation-emitting surface area that is less than the area of said window, said nuclear radiation being produced by a radioactive material of appreciable volume and radiation-emitting surface area, means for supporting said source and detector means in said spaced apart relation, means disposed between said detector and the material to select substantially only the part of the nuclear radiation passing through the material that radiates directly from said source surface area, said selecting means including a collimator having apertures, said collimator apertures being holes in a block of nuclear radiation shield material, the axis of each of said holes being angularly disposed with respect to a line drawn from a central portion of said detector to a central portion of said source, angles $\phi$ formed at the intersection of said line and said axes in planes containing said line for each of said holes being a function of the perpendicular distance $x$ of the respective holes from said line in accordance with the relation, $$\phi = \tan^{-1} \frac{x}{L}$$

where L is the distance between said detector and the effective source location of said source.

14. Improved apparatus for measuring a characteristic of a material, that is transported by a material conveyor with nuclear radiation to minimize flutter, said apparatus comprising, source and detector means spaced apart for said material to pass therebetween, said detector having a circular window to be positioned adjacent the material for producing an electrical signal that is a function of nuclear radiation passing through the material from said source, said source having a radiation-emitting surface area that is less than the area of said window, said nuclear radiation being produced by a radioactive material of appreciable volume and radiation-emitting surface area, means for supporting said source and detector means in said spaced apart relation, a nuclear radiation collimator supported with said detector over said window, said collimator comprising a number of concentric rings disposed in substantially the same plane centered on the central axis of said window, the outermost ring aligning with the outer edge of said window so that all the radiation entering said detector passes through said collimator, each of said rings being part of a surface of revolution generated by a line passing through the effective source location of the source, said collimator having several radial dividers extending between each of said rings and from the narrow to the wide sides of each of said rings, said dividers being parallel to said central axis of said window.

References Cited

UNITED STATES PATENTS

| 2,942,109 | 6/1960 | Bell et al. | 250—105 |
| 3,197,638 | 7/1965 | Sinclair | 250—105 |

FOREIGN PATENTS

| 638,968 | 6/1950 | Great Britain. |

ARCHIE R. BORCHELT, *Primary Examiner.*

RALPH G. NILSON, *Examiner.*

A. L. BIRCH, *Assistant Examiner.*